US011988367B2

(12) United States Patent
Greenberg

(10) Patent No.: US 11,988,367 B2
(45) Date of Patent: *May 21, 2024

(54) PUT WALL LIGHT INTEGRATION SYSTEM, DEVICES, AND ASSOCIATED METHODS

(71) Applicant: Software Developers LLC, Lakewood, NJ (US)

(72) Inventor: Jeremy Greenberg, Lakewood, NJ (US)

(73) Assignee: SELLERCLOUD, LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/934,373

(22) Filed: Sep. 22, 2022

(65) Prior Publication Data
US 2023/0018352 A1 Jan. 19, 2023

Related U.S. Application Data

(63) Continuation of application No. 17/358,599, filed on Jun. 25, 2021, now Pat. No. 11,466,843.

(51) Int. Cl.
*F21V 21/14* (2006.01)
*B65G 1/137* (2006.01)
*F21V 21/04* (2006.01)
*F21V 23/06* (2006.01)
*F21Y 113/00* (2016.01)

(52) U.S. Cl.
CPC .......... *F21V 21/145* (2013.01); *F21V 21/047* (2013.01); *F21V 23/06* (2013.01); *B65G 1/1378* (2013.01); *F21Y 2113/00* (2013.01)

(58) Field of Classification Search
CPC ...... F21V 21/145; F21V 21/047; F21V 23/06; F21V 21/14; F21S 2/00; F21Y 2113/00; F21Y 2113/10; F21W 2131/402; B65G 1/1378; B65G 2209/04
See application file for complete search history.

(56) References Cited

U.S. PATENT DOCUMENTS 10,577,180 B1 * 3/2020 Mehta .................. B25J 9/162
11,466,843 B2 * 10/2022 Greenberg ............ F21V 23/06
2021/0261331 A1 * 8/2021 Otto ................... B65G 1/0421

* cited by examiner

*Primary Examiner* — Peggy A Neils
(74) *Attorney, Agent, or Firm* — Mark Malek; Widerman Malek, PL

(57) ABSTRACT

A sorting system including a plurality of sorter light boxes, a hub, and a controller. The plurality of sorter light boxes may each be configured to be mounted to a respective shelf, and may each configured to be coupled to another one of the sorter light boxes to create a chain of sorter light boxes. The hub may be configured to be coupled to a first sorter light box in the chain of sorter light boxes. The hub may also be configured to operate as a concentrator of control signals and power for the sorter light boxes. The controller may be configured to be coupled to the hub and may be configured generate control signals for the sorter light boxes.

35 Claims, 16 Drawing Sheets

Configure Your Skublox

Wall

[North Wall ▾]  Edit  Delete  [Add]

Warehouse is 'Default Warehouse' (bin enabled)
Wall Segment Shape is 4 x 3
No Slots configured yet

[ Save ]    [ Cancel ]

FIG. 4A

② Add Wall

Name
[            ]

Warehouse
[Select... ▾]

Max Active Users
[6]

Wall segment shape
Columns    Rows
[4]        [4]

Flow direction
[Z Snake ▾]

Wall name is required

[ Save ]    [ Cancel ]

FIG. 4B

PUT WALL LIGHT INTEGRATION SYSTEM, DEVICES, AND ASSOCIATED METHODS

RELATED APPLICATIONS

This application is a continuation application of and claims priority under 35 U.S.C. § 120 of U.S. patent application Ser. No. 17/358,599 filed on Jun. 25, 2021 and titled PUT WALL LIGHT INTEGRATION SYSTEM, DEVICES, AND ASSOCIATED METHODS. The content of this application is incorporated herein by reference.

FIELD OF THE INVENTION

The present invention relates to systems and methods for eCommerce and warehouse management that include sorting and shipping orders to customers.

BACKGROUND OF THE INVENTION

It is known in the field of supply chains that running a distribution operation comes with several well-known challenges. There is technology available that can help address all these challenges.

In a simple pick and pack operation or in a highly automated distribution center, a Picking Wall or Put Wall can be used in eCommerce or retail operations and can be fairly economical. As a brief overview of the system, a Put Wall is basically a shelving system (dynamic or static) outfitted with put lights. Each shelf slot, box, or tote represents an order for an eCommerce customer or part of a store order in a retail operation. Totes are picked upstream, mainly batch picked, at active locations (pick modules or racks) and conveyed to the put wall area. Typically, products are picked off the shelf in bulk to fulfill orders, as a wave pick, then brought to the put wall for sortation Ideally, using totes involves a conveyor, but if there is no automation, pick totes may be transported to the Put Wall. Goods are then scanned using a put-to-light system and sorted into the slots/totes/boxes assigned to the orders in the picklist assigned to the Put Wall. An order may include multiple items. Once an order is complete, as in most typical put-to-light systems, the light associated with the order lights up on the back side of the shelf where a packer retrieves the goods and packs it at a station. The packer then scans/acknowledges the light and ships the order. After the order has been shipped the light may blink and/or turn off.

Barcode scanners and lights are used to ensure accuracy as scanning the product identifies the order corresponding to the item and lights up an appropriate slot for placement. Shelving can be very easily reconfigured, even if the conveyor cannot, so that zones are adjusted to changing demand/number of employees. Put zones can also be turned off/on and multiple lights can be used so that multiple operators can operate in the same zone, e.g. each operator or sorter having an associated color of light. Shelf spacings can be adjusted to allow for larger/smaller product to be handled. This goes for hazardous, high value or other product that for other reasons needs to be segregated. Also, the system may assign a slot to a location near the employee to prevent multiple operators from bumping into each other.

A Put Wall area can be set up in several spots or in a large area which may be scalable for future growth and peak demand. Cycle times with put walls may be improved because of the ability to have multiple put walls operating simultaneously as it takes less time to get a large number of orders completed. Lastly, a Put Wall does not necessarily need conveyor or any type of specialized material handling equipment.

However, there may be a need for a customizable, simplified sorting and optimized fulfillment approach with streamlined picking, sorting, and shipping including scalable efficiency for eCommerce and warehouse management.

This background section is intended to introduce the reader to various aspects of typical technology that may be related to various aspects or embodiments of the present invention, which are described and/or claimed below. This discussion is believed to be useful in providing the reader with background information to facilitate a better understanding of the various aspects and embodiments of the present invention. Accordingly, it should be understood that these statements are to be read in light of, and not as admissions of, the prior art.

This background information is provided to reveal information believed by the applicant to be of possible relevance to the present invention. No admission is necessarily intended, nor should be construed, that any of the preceding information constitutes prior art against the present invention.

SUMMARY OF THE INVENTION

With the above in mind, embodiments of the present invention are related to a sorting system including one or more sorter light boxes, one or more shipper light boxes, a hub, and a controller. The sorter light boxes may be configured to be mounted to shelves, and may also be configured to be coupled to one another to form a chain of sorter light boxes. The shipper light boxes may each be configured to be coupled to a single sorter light box and also positioned at the same shelf as the sorter light box that it is coupled to. The hub may be configured to be coupled to one of the sorter light boxes in the chain of sorter light boxes. The hub may be configured to operate as a concentrator of control signals and power for the sorter light boxes. The controller may be configured to be coupled to the hub and also be configured to generate control signals for the sorter light boxes.

The sorting system may include a first power supply that configured may be coupled to the hub and supply power to the plurality of sorter light boxes. The sorting system may also include a repeater. The repeater may be configured to be coupled within the chain of sorter light boxes to push power along the chain of sorter light boxes. The sorter light boxes may be configured to receive Power over Ethernet (PoE) via the hub and the first power supply.

The controller may be configured to generate the control signals for the plurality of sorter light boxes based upon commands received via an externally coupled network and sorter scans from a handheld device coupled thereto. The handheld device may include a mobile application to emit the commands based upon the sorter scans by the handheld device. Each of the sorter light boxes may be configured to provide a light indication that indicates to a sorter which respective shelf to place the item.

Each of the sorter light boxes may also be configured to provide a designated colored light indication. The designated colored light indication may be associated with a respective sorter. Each of the sorter light boxes may include a housing and a light source. The housing may include mounting features and/or a mounting bracket. The controller may include a wireless communication interface to communicate with an externally coupled network.

BRIEF DESCRIPTION OF THE DRAWINGS

Some embodiments of the present invention are illustrated as an example and are not limited by the figures of the accompanying drawings, in which like references may indicate similar elements.

FIGS. 4A-4C are diagrams illustrating examples of the graphical user interface (GUI) of the mobile application software that runs on a mobile device associated with the customizable item sorting system of FIG. 2.

DETAILED DESCRIPTION OF THE INVENTION

Figure 1:
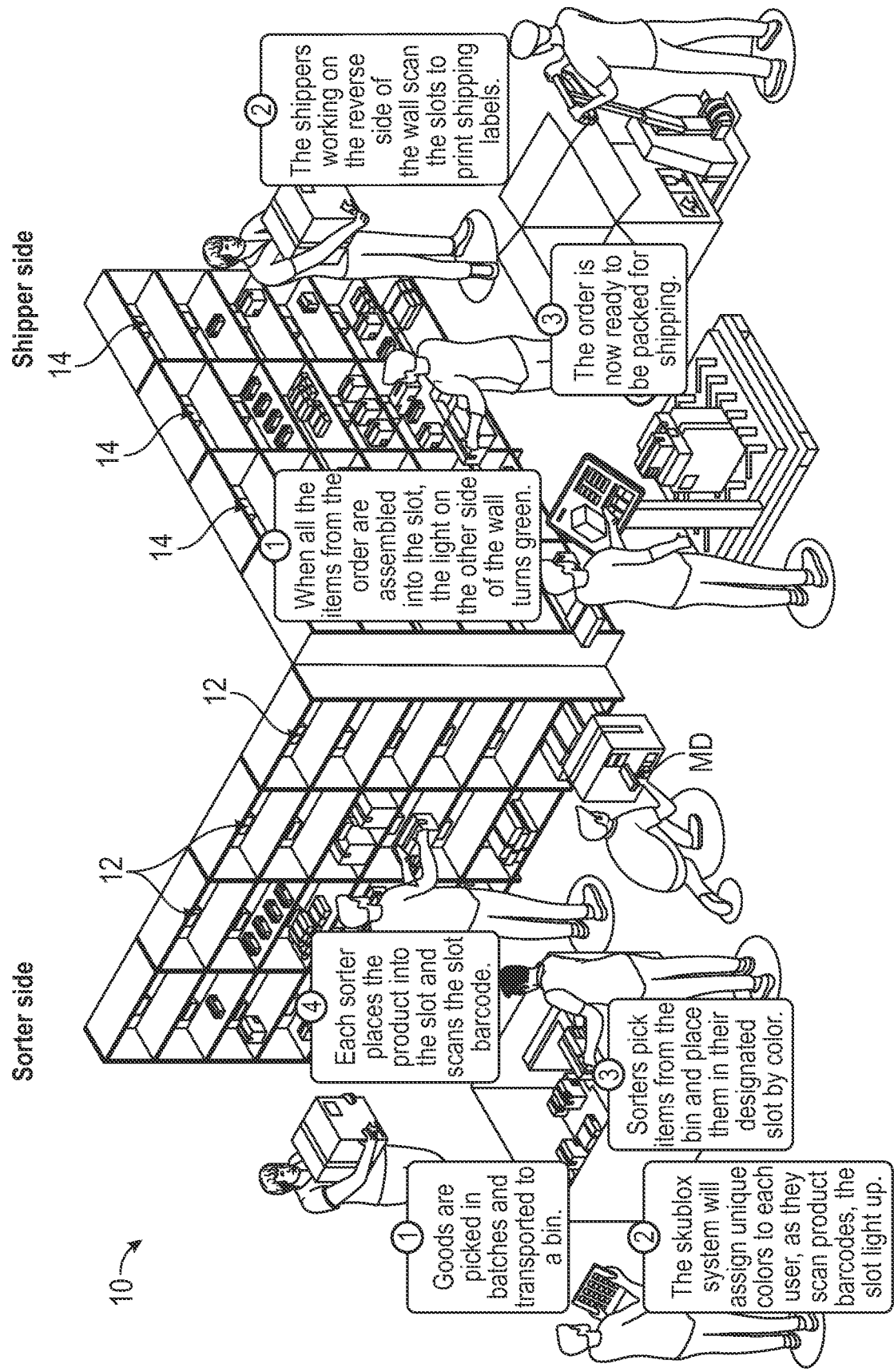
FIG. 1 is a schematic diagram illustrating an overview of a customizable item sorting arrangement including the sorter side and shipper side in accordance with features of the present invention.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Those of ordinary skill in the art realize that the following descriptions of the embodiments of the present invention are illustrative and are not intended to be limiting in any way. Other embodiments of the present invention will readily suggest themselves to such skilled persons having the benefit of this disclosure. Like numbers refer to like elements throughout.

Although the following detailed description contains many specifics for the purposes of illustration, anyone of ordinary skill in the art will appreciate that many variations and alterations to the following details are within the scope of the invention. Accordingly, the following embodiments of the invention are set forth without any loss of generality to, and without imposing limitations upon, the invention.

In this detailed description of the present invention, a person skilled in the art should note that directional terms, such as "above," "below," "upper," "lower," and other like terms are used for the convenience of the reader in reference to the drawings. Also, a person skilled in the art should notice this description may contain other terminology to convey position, orientation, and direction without departing from the principles of the present invention.

Furthermore, in this detailed description, a person skilled in the art should note that quantitative qualifying terms such as "generally," "substantially," "mostly," and other terms are used, in general, to mean that the referred to object, characteristic, or quality constitutes a majority of the subject of the reference. The meaning of any of these terms is dependent upon the context within which it is used, and the meaning may be expressly modified.

The present system and method may use wireless communications. Generally, depending on the type of wireless communication system, a wireless communication device or mobile device, such as a smartphone, cellular telephone, two-way radio, personal digital assistant (PDA), personal computer (PC), laptop computer, home entertainment equipment, etc., communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system) and communicate over that channel or channels. For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

Mobile devices can be portable handsets, smartphones, or personal digital assistants, although they may be implemented in other forms. For example, mobile devices can be tablet computers, such as iPads, or other computing devices configured for communication through a mobile wireless communication network and/or other types of wireless communication links. Program applications, including the present warehouse management and shipping application, can be configured to execute on many different types of mobile devices. For example, a mobile device application can be written to execute on a Windows Mobile based mobile device, Android, iPhone, Java Mobile, or Blackberry based mobile device, for example.

An embodiment of the invention, as shown and described by the various figures and accompanying text, provides a light box sorting system (also referred to as the Skublox system) for use with put wall systems and methods for eCommerce and warehouse management that include picking and shipping orders to customers.

Some definitions that may be used in the following description: Repeater is a device that supplies additional 12V power to the Skublox system, and also known as a Power Injector; Controller is a computer (e.g. PC running Microsoft Windows and the Skublox Hub Application); Hub Device is a device that plugs into the Controller (e.g. via USB) with a standalone power supply, and it is controlled by the Skublox Hub Application; Picklist is a list consisting of the items for orders; Scanner Ring is a wearable barcode scanner that allows for greater mobility when scanning and sorting orders; Shipper is a person who works on the shipping side of the Skublox Wall; Shipper Light is a small coupled (e.g. ethernet-cable-connected) device that lights up in green, for example, to signal that the order is ready to be shipped; SKU is the Stock Keeping Unit that is the unique product code assigned to a product, SKUs are used as the primary product identifier, and typically merchants create their own code as the product SKU; Skublox Hub Application is Universal Windows Platform (UWP) application, for example, that is installed on the Controller; Skublox Wall is a collection of slots equipped with pairs of shipper and sorter lights interconnected with cabling; Slot is a compartment for sorting product units or items; Sorter is a person who works on the sorting side of the Skublox Wall; Sorter Light is a small coupled (e.g. ethernet-cable-connected) device that lights up in a specific color to signal status, e.g., a Sorter Light can light up in Red, Blue, Yellow, Green, Magenta, and Cyan, for example; and UPC is the Universal Product Code which is a type of code printed on the retail product packaging to help identify a particular item.

Figure 2:
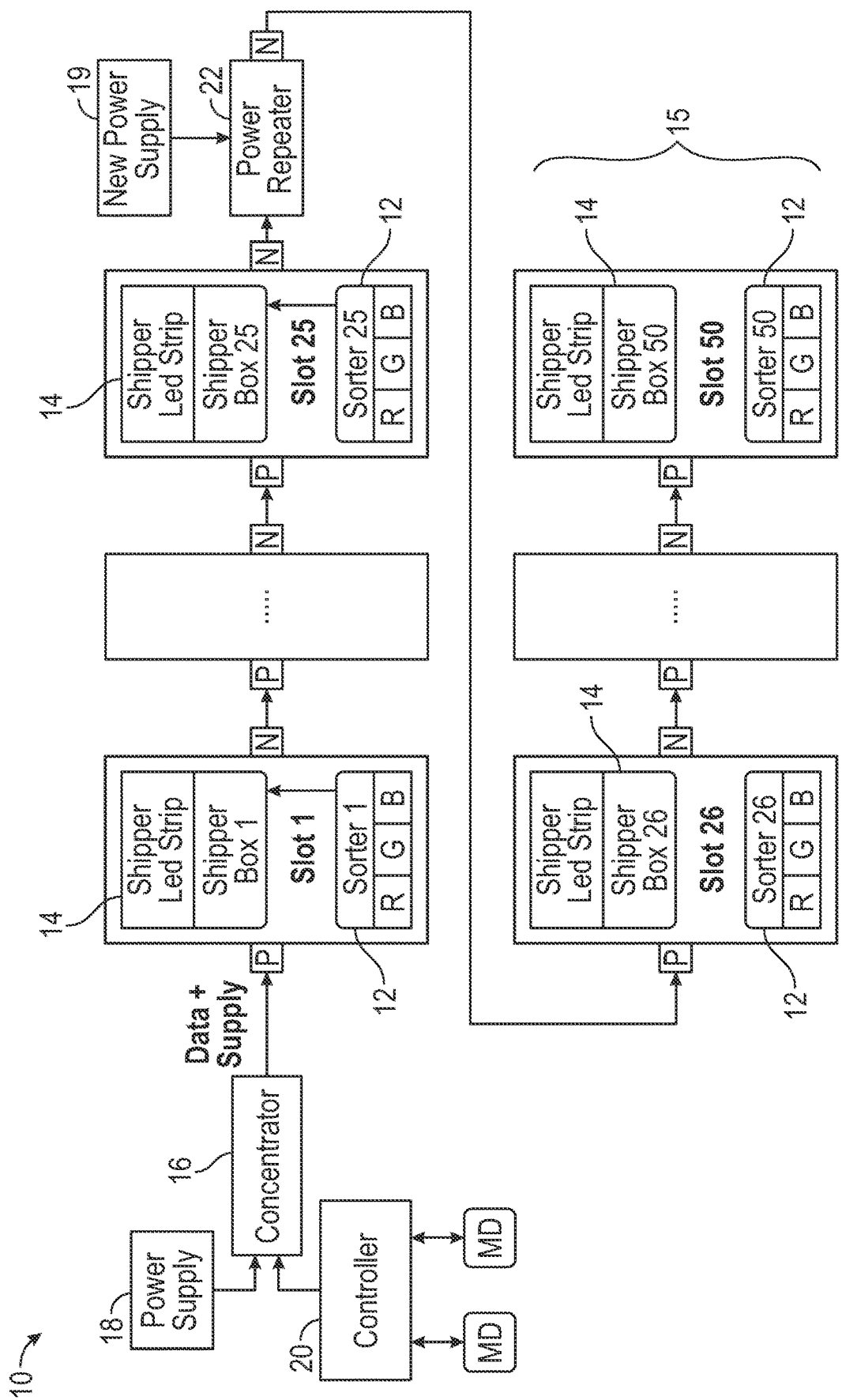
FIG. 2 is a schematic block diagram illustrating the customizable item sorting system of the present invention.
Figure 3:
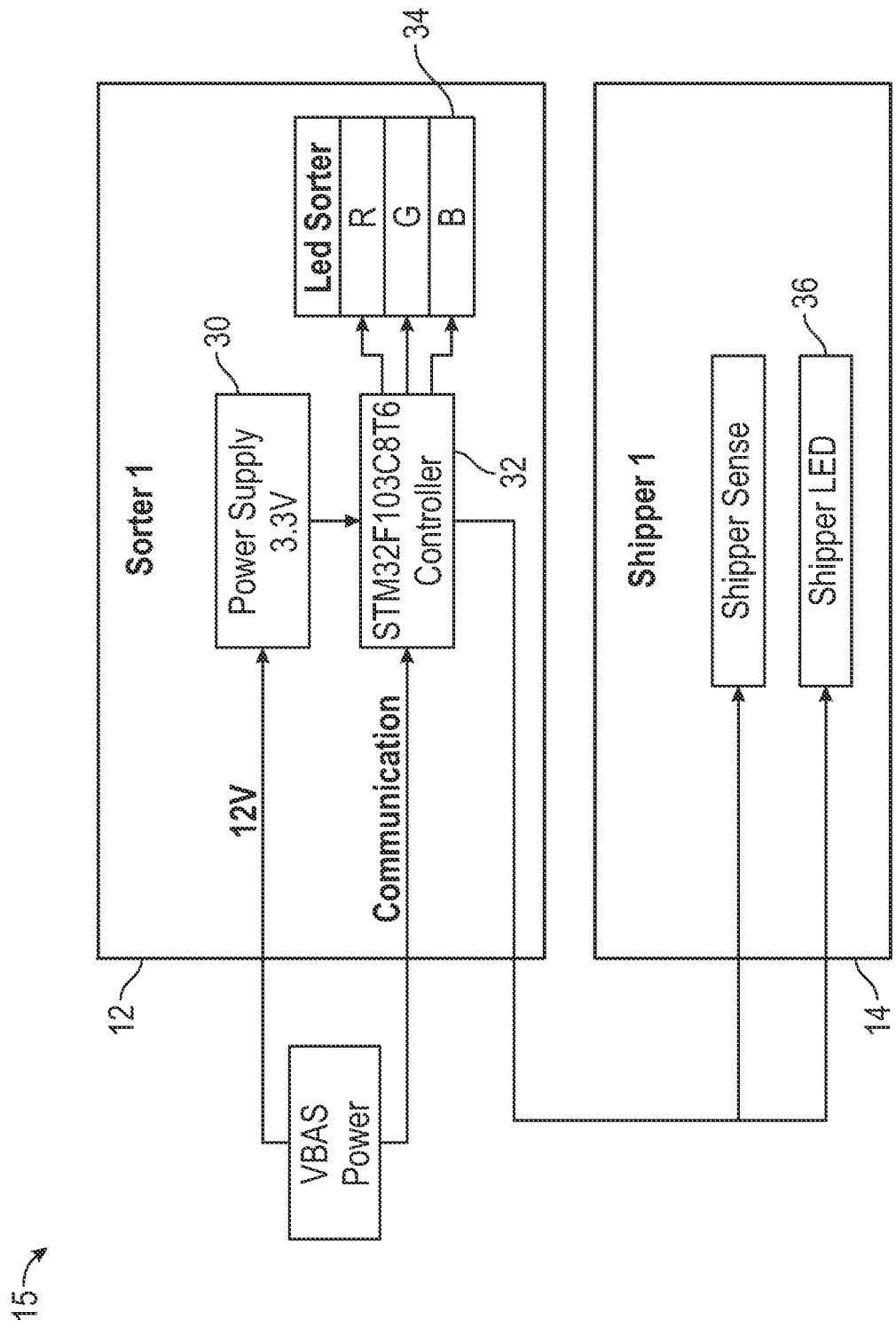
FIG. 3 is a schematic diagram illustrating a sorter light box and associated shipper light box of the customizable item sorting system of FIG. 2.

With reference to FIGS. 1-3, the customizable item sorting system 10 (or light box system) of the present invention (e.g. which may be referred to as Skublox®) is a system of electronics and light boxes that connects to existing warehouse management software to help direct operations in a warehouse. Software is currently used by internet retailers to manage their inventory and warehouse operations including picking and shipping orders to customers. The system 10 is designed specifically to help with the sorting of items, matching them to specific orders.

Referring specifically to FIG. 1, on the Sorter side, 1—someone picks the items or products from within the warehouse in bulk and then brings the items to a sorting area where they are matched to specific orders and then shipped. 2—The sorter scans a picked product with a mobile application (e.g. running on a handheld or mobile device MD) and 3—a sorter light box 12 directs them to 4—place the item in a corresponding slot (or shelf or tote). On the Shipper side, there is shipper light box 14 that: 1—indicates when the order is ready to ship, and 2—a shipper may scan the notch with the items and proceed to 3—ship the order. Multiple users can scan items at the same time and the sorter light boxes 12 light up a specific color for each user. How the boxes 12/14 are positioned is customizable by the user, and they can be mounted on shelves as they see fit, based on the size of the types of items they need to sort and ship.

FIG. 2 is a schematic block diagram illustrating the main components of the customizable item sorting system 10. The customizable item sorting system 10 includes a plurality of sorter light boxes 12 (e.g. Sorter 1 through Sorter 50) each configured to be customizably positioned at a respective shelf at the warehouse sorting wall or area. Each of the sorter light boxes 12 is configured to be coupled to another one of the sorter light boxes 12 to define a chain of sorter light boxes (also referred to as a daisy chain). Each of the sorter light boxes may be configured to provide a light indication to a sorter indicating which respective shelf to place the item. As such, each of the sorter light boxes 12 may be configured to provide a designated colored light indication, from among a plurality of different colored light indications, so that multiple sorters can sort items simultaneously while each of the sorters is associated with a respective color of the different colored light indications.

A plurality of shipper light boxes 14 (e.g. Shipper Box 1 through Shipper Box 50) are each configured to be coupled to a respective sorter light box 12 and positioned at the respective shelf. Each of the shipper light boxes 14 is configured to provide a light indication to the shipper indicating that an order is ready to be shipped. A respective sorter light box 12 and associated shipper light box 14 may define a sorting/shipping light box pair 15 as illustrated in FIG. 2.

A concentrator or hub 16 is coupled to a first sorter light box 12 (e.g. Sorter 1) and operates as a concentrator of control signals and power for the plurality of sorter light boxes 12 in the chain. A first power supply 18 is configured to be coupled to the hub 16 and supply power to the sorter light boxes 12 and shipper light boxes 14. Additional power supplies, e.g. a second power supply 19 may be included within the chain and a repeater 22 is coupled within the chain to push power (e.g. from the second power supply 19) along the chain of sorter light boxes 12 and shipper light boxes 14.

A controller 20 is configured to be coupled to the hub 16 and generate the control signals for the sorter light boxes 12 in the chain, and the shipper light boxes 14, based upon commands received via an externally coupled network. The controller 20 may be configured to generate the control signals for the sorter light boxes 12 based upon commands received via the externally coupled network and sorter scans from a handheld or mobile device MD coupled thereto. The controller preferably includes a wireless communication interface to communicate with the externally coupled network. However, wired communication is also contemplated.

FIG. 3 is a schematic diagram illustrating a sorter light box 12 and associated shipper light box 14 of the customizable item sorting system 10. As shown, the sorter box 12 may include internal power circuitry 30, local controller 32 and a plurality of light elements 34 (e.g., LED elements for Red, Green, Blue, Cyan, Magenta, Yellow). The shipper light box 14 may only include a single light element 36 (e.g., a Green LED).

There are software components in the system 10 that may include: the hub software (e.g. web application) that is run on the controller 20 or a local computing device (e.g. a laptop or PC); a mobile application software that is run on a handheld or mobile device MD; and the firmware that resides on the four hardware devices (sorter light box 12, shipper light box 14, hub 16 and controller 20) described above and keeps everything communicating together.

Figure 4C:
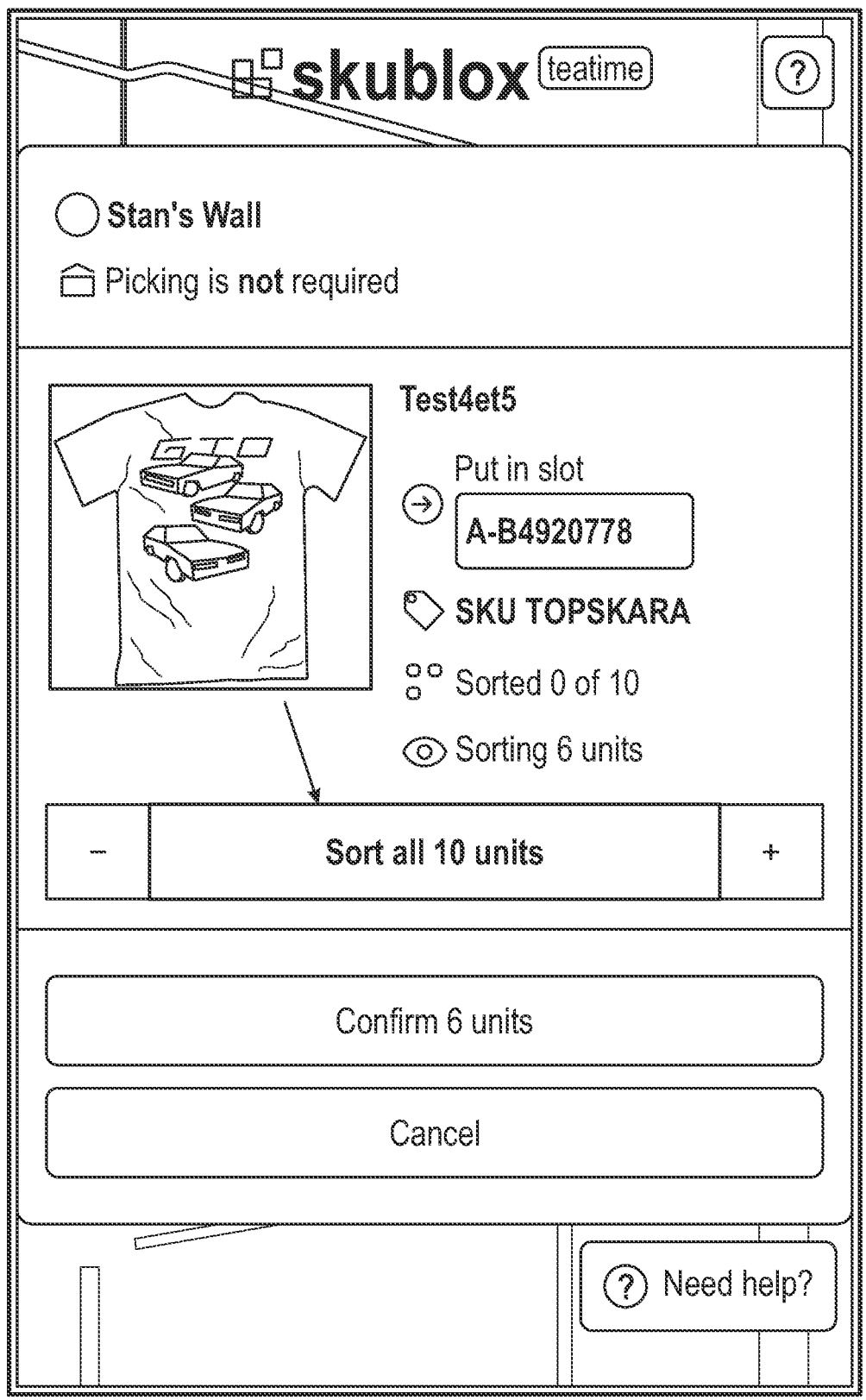

FIGS. 4A-4C are diagrams illustrating examples of the graphical user interface (GUI) of the various software that runs on the controller 20 and/or the mobile device MD associated with the customizable item sorting system 10 of the present embodiments. FIG. 4A illustrates a screen during set-up to Configure the customizable item sorting system 10 by naming a sorting wall and selecting to edit the arrangement. FIG. 4B illustrates a subsequent screen during set-up for adding details or parameters regarding a particular sorting wall. FIG. 4C illustrates an example of a sorter's screen to aid in the scanning and sorting process.

Figure 4D:
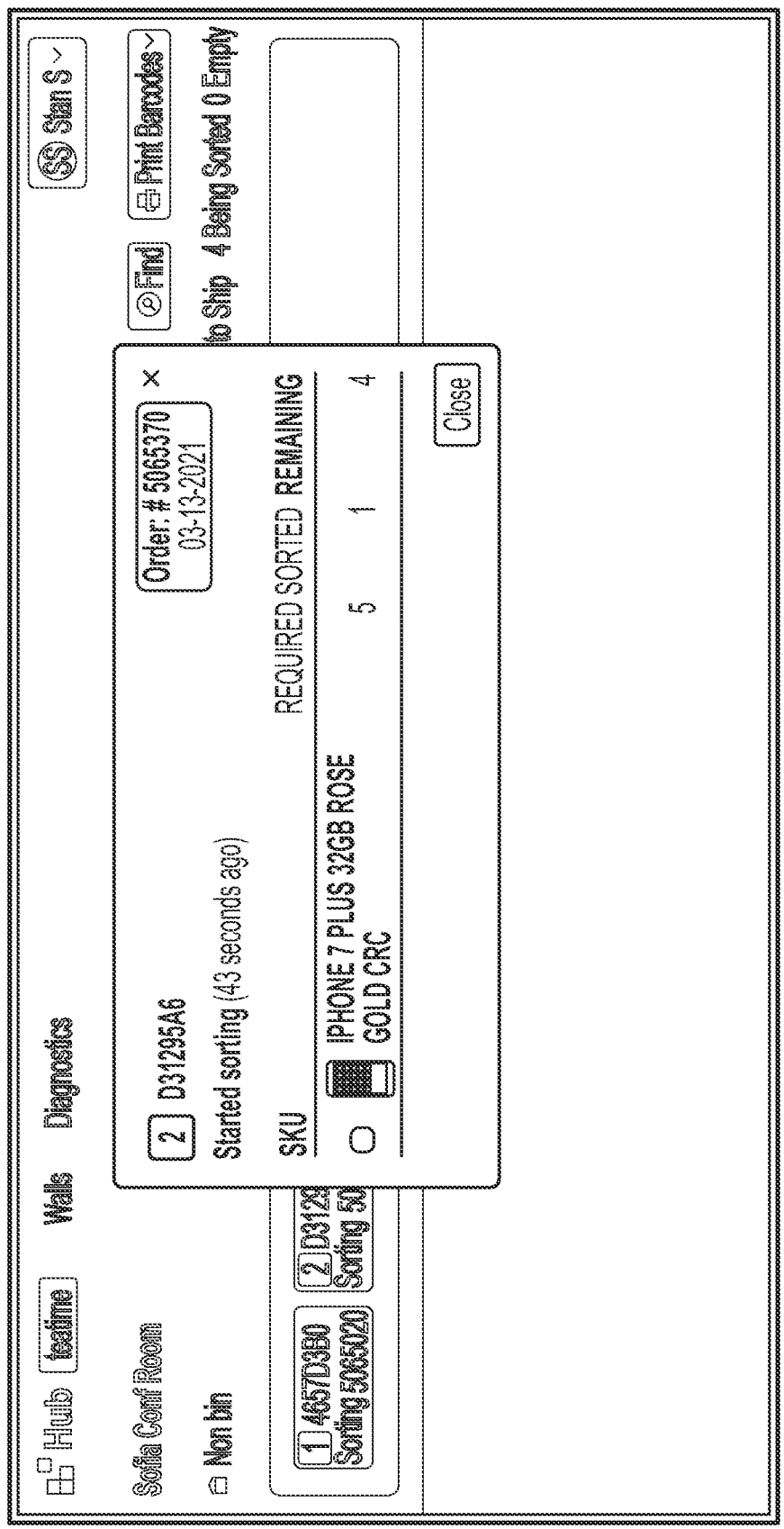
FIGS. 4D and 4E illustrate examples of a GUI of the Hub web application associated with the customizable item sorting system of FIG. 2.
Figure 4E:
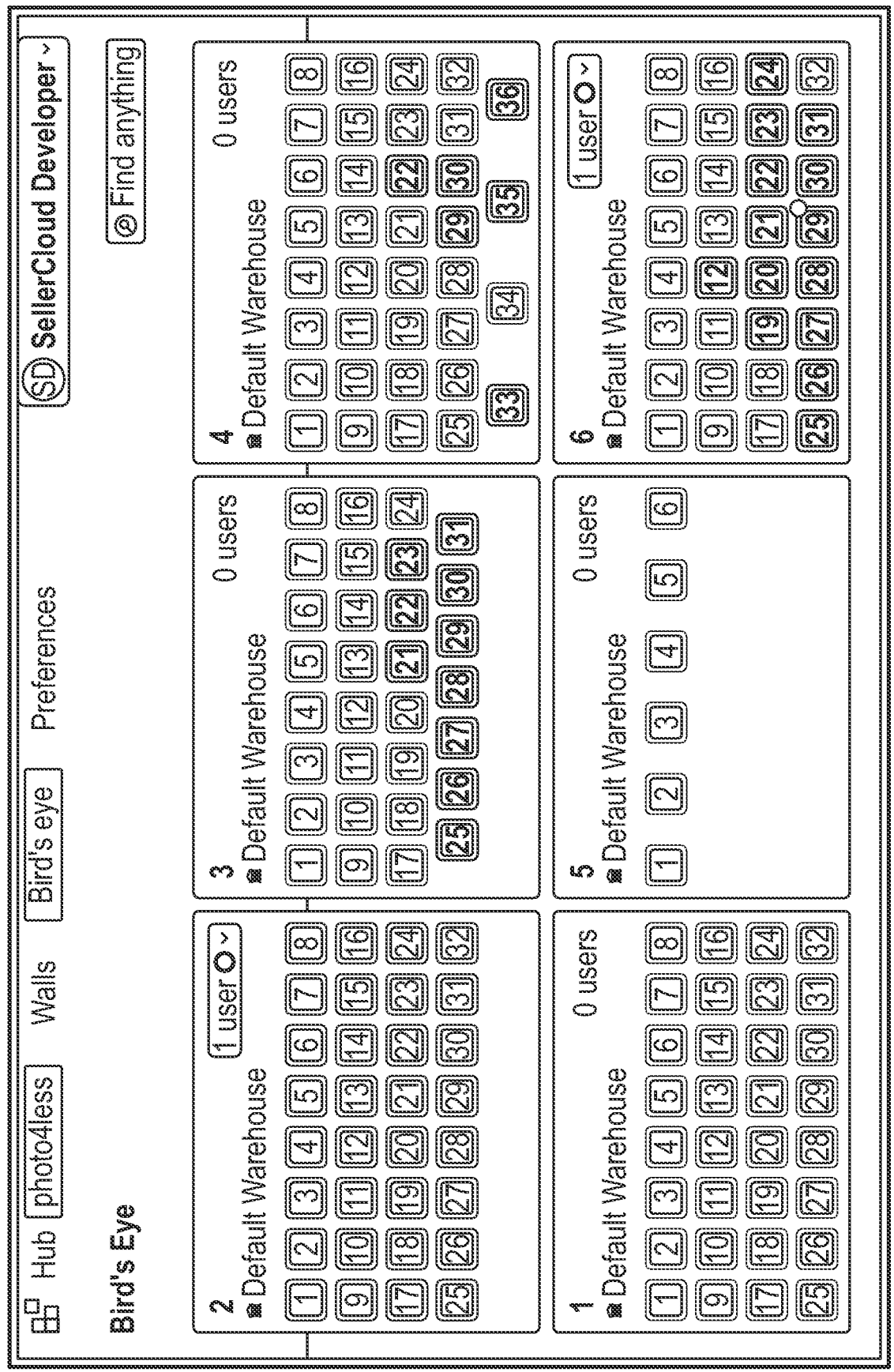
Figure 5A:
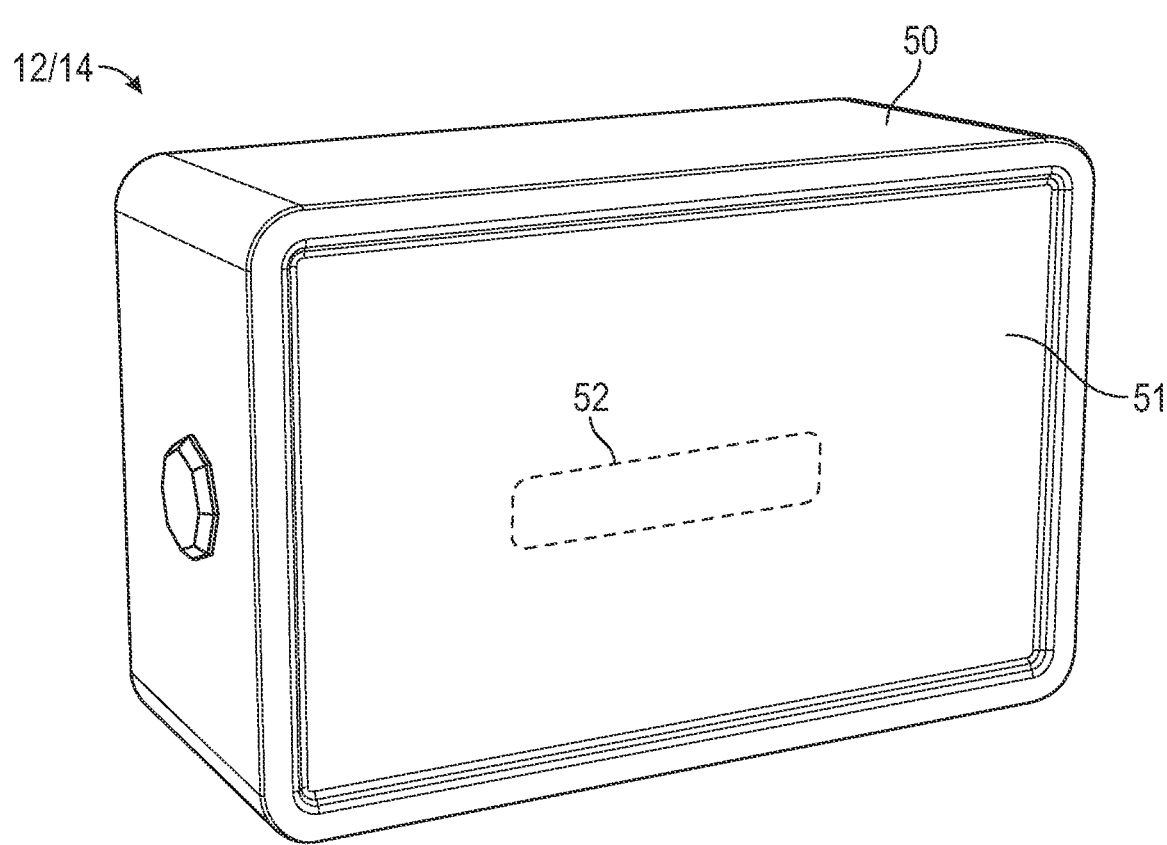
FIGS. 5A-5H are various views that schematically illustrate an example embodiment of a sorter light box and shipper light box of the customizable item sorting system of FIG. 2.
Figure 5B:
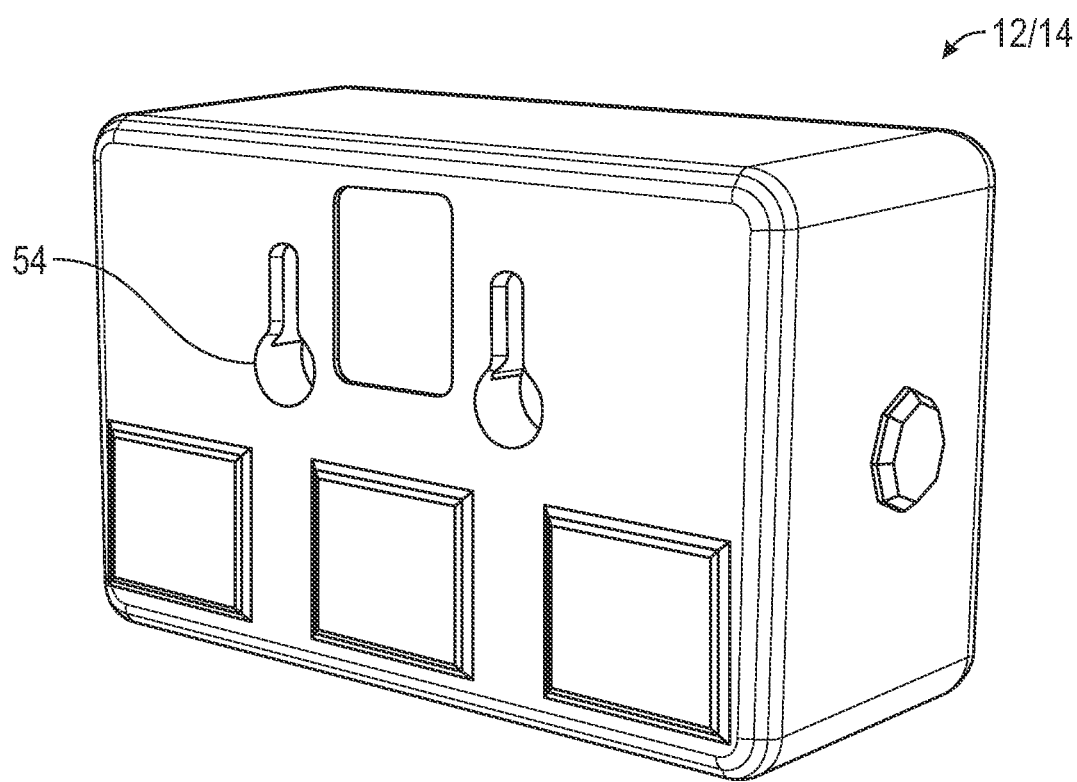
Figure 5C:
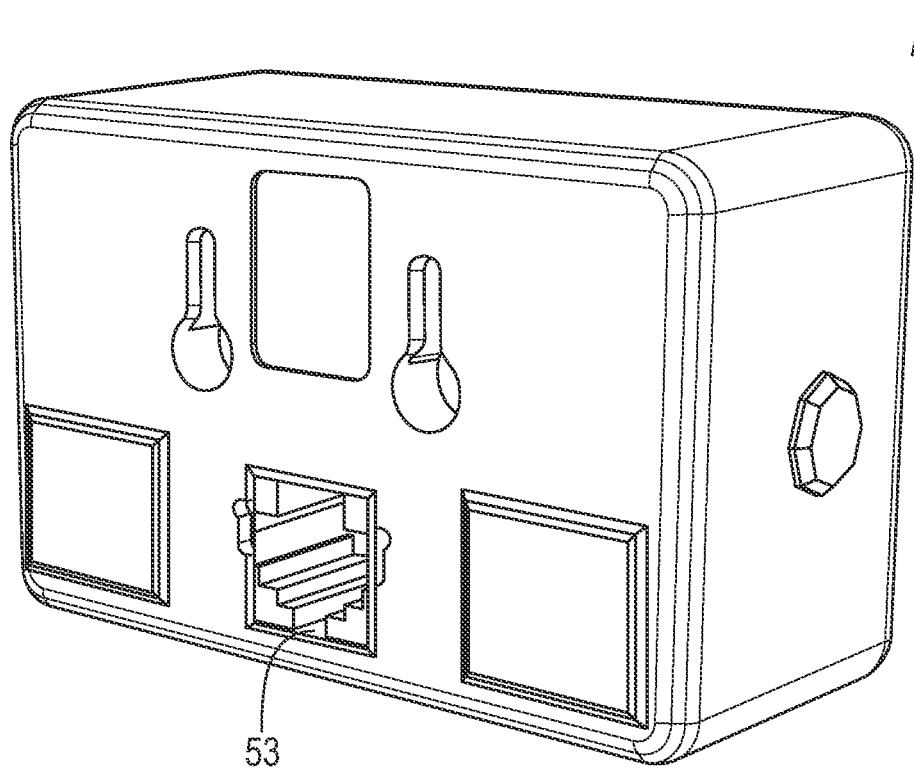
Figure 5D:
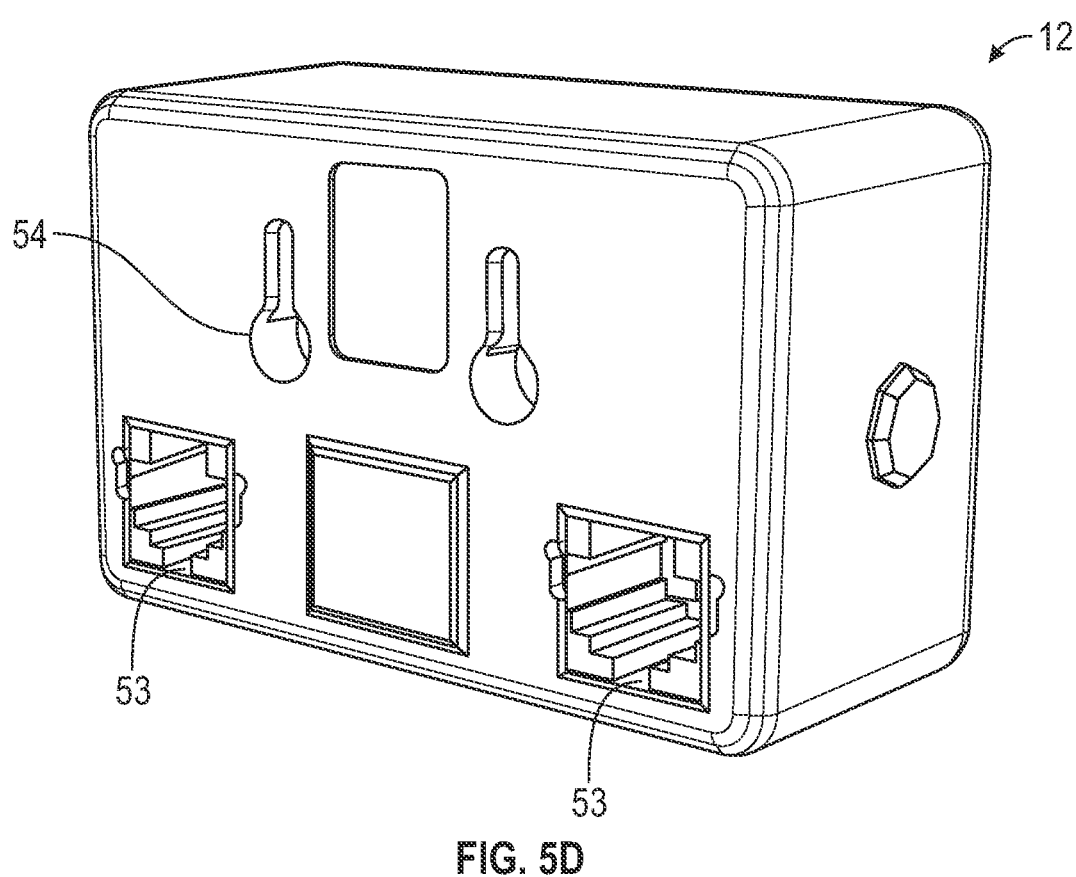
Figure 5E:
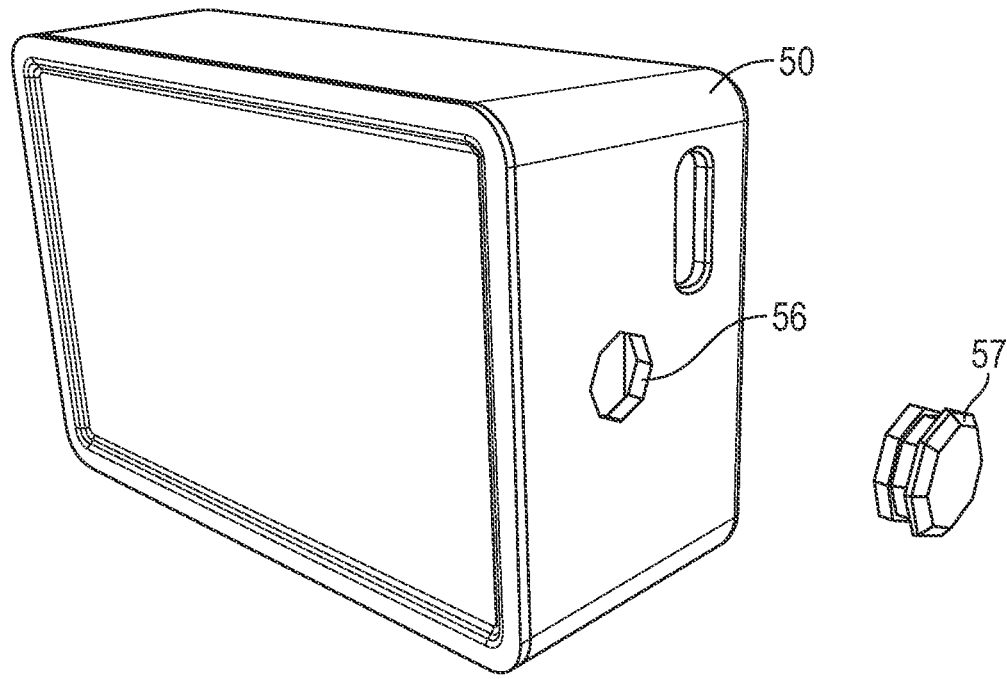
Figure 5F:
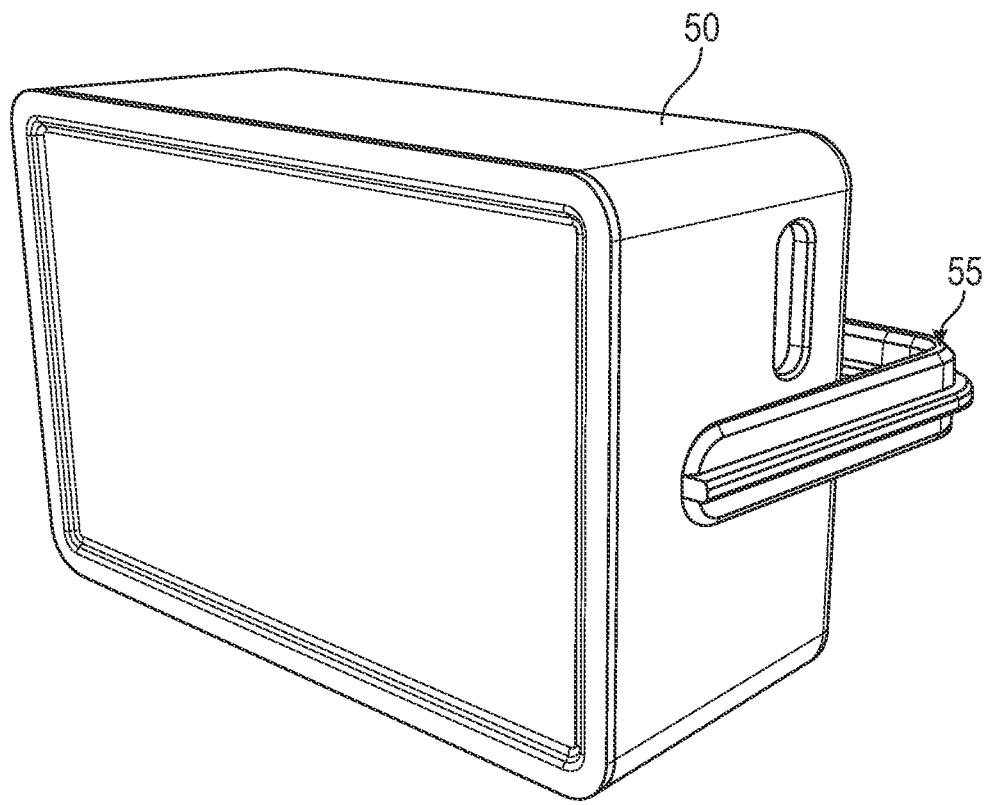
Figure 5G:
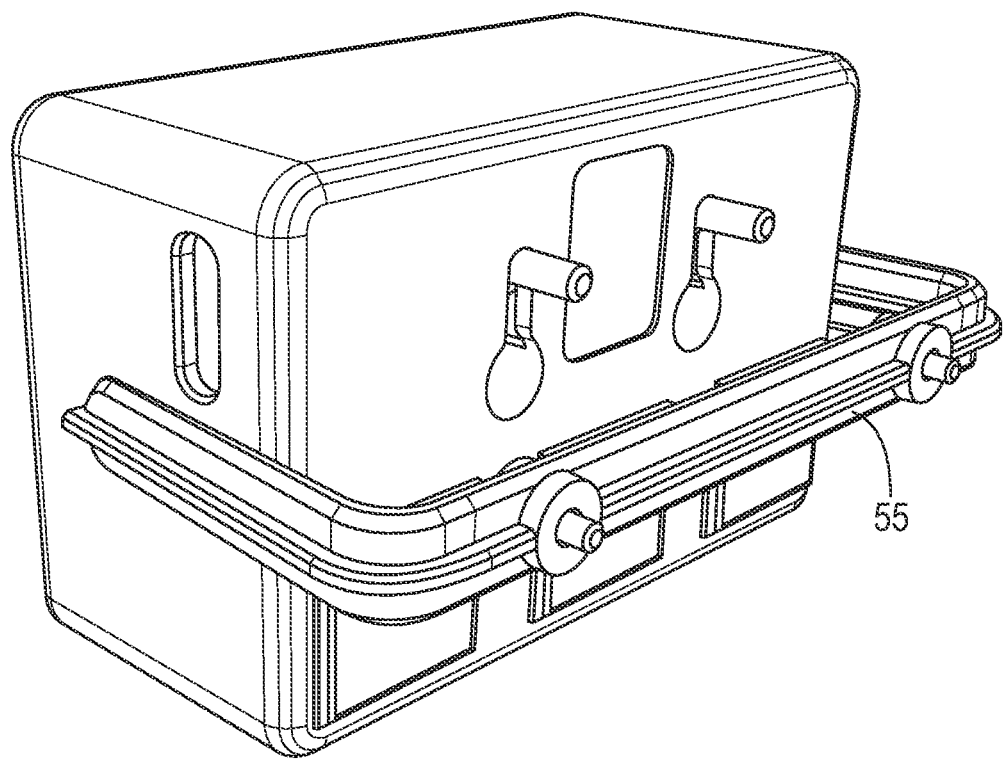
Figure 5H:
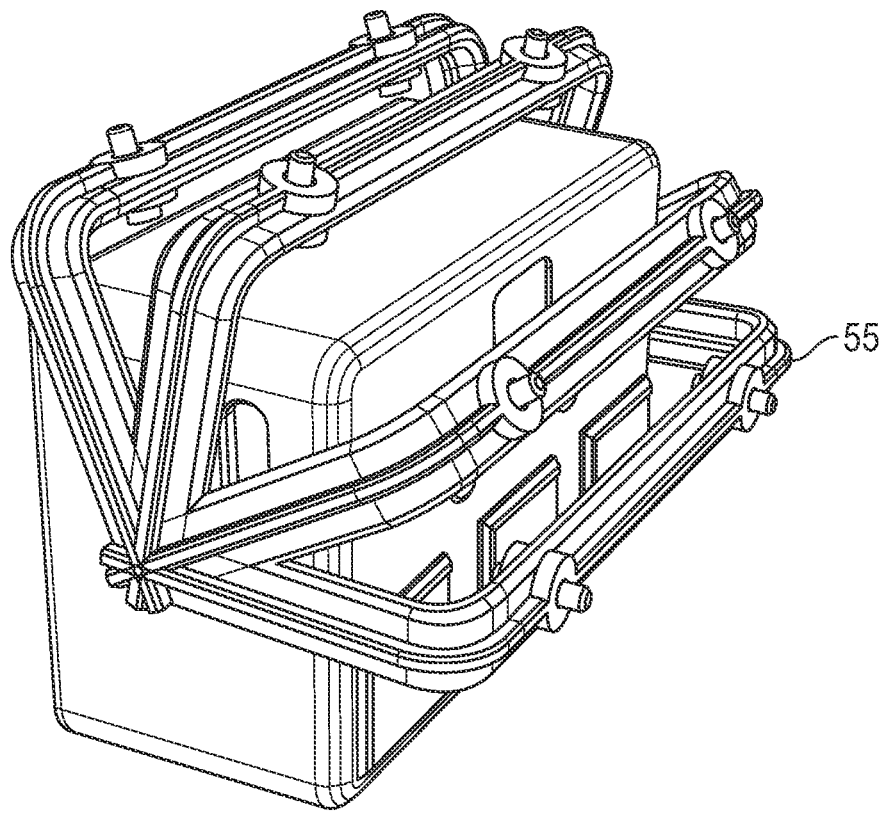

FIGS. 4D and 4E illustrate examples of a GUI of the Hub web application where the sorting activity can be monitored via a client device such as a PC, tablet or laptop, for example. The user can see the current state of each slot on the wall, the activities of the users, etc.

Some additional features of the mobile sorter application may include, for example, providing suggestions as to what to sort next to complete slots that are in process, filtering the orders by a picklist so that the system assigns an order limited to the orders of the picklist, and/or a feature to accept a replacement item for an order.

The sorter light boxes 12 and shipper light boxes 14 may have the same design, for example, as illustrated in FIGS. 5A-5H. The sorter light boxes 12 and shipper light boxes 14 may have various features including a housing 50, a lens 51 or other light transmission surface, internal light sources 52 (e.g. LED light sources), network cable ports 53, mounting features (e.g. mounting holes 54), and optional and/or removable pivoting mounting bracket 55, for example, as illustrated. Such a removable pivoting mounting bracket 55 may be positioned on the housing via an aperture 56 that is accessed by removing a cover 57. The sorter light boxes 12 may have three network cable ports 53 while the shipper light boxes 14 may have a single network cable port 53.

Figure 6A:
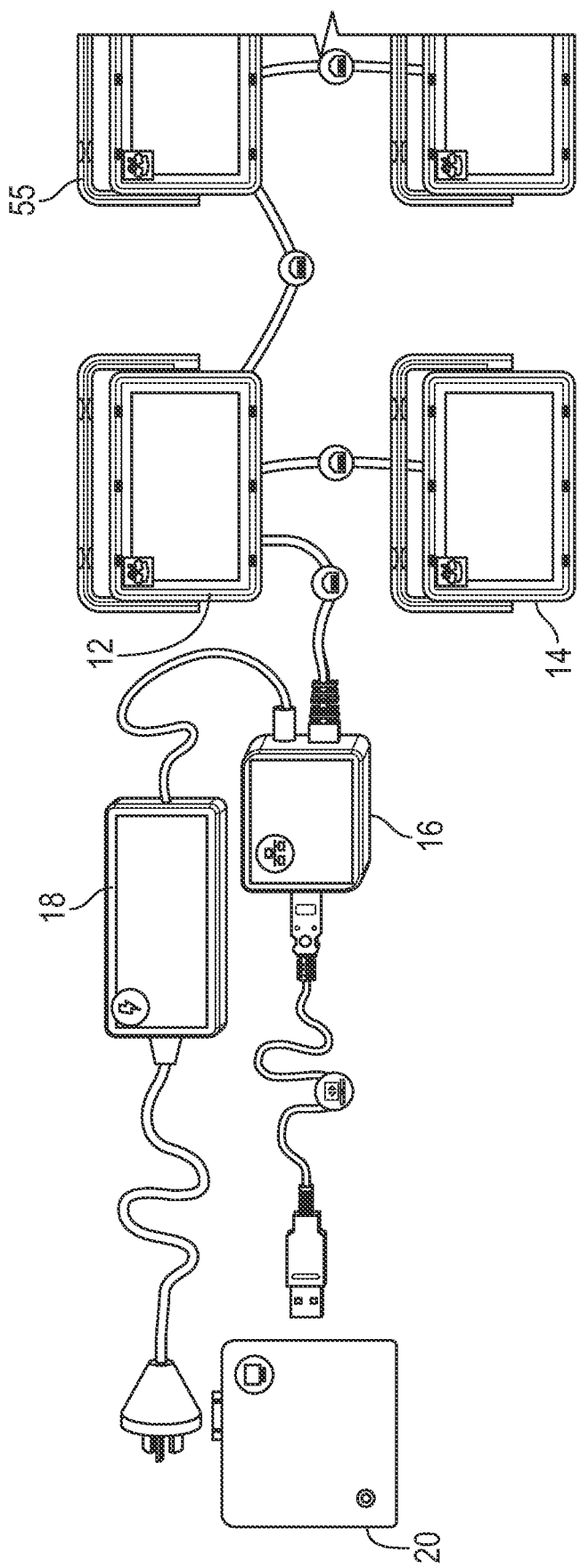
FIGS. 6A and 6B are schematic diagrams illustrating a portion of the customizable item sorting system of FIG. 2.
Figure 6B:
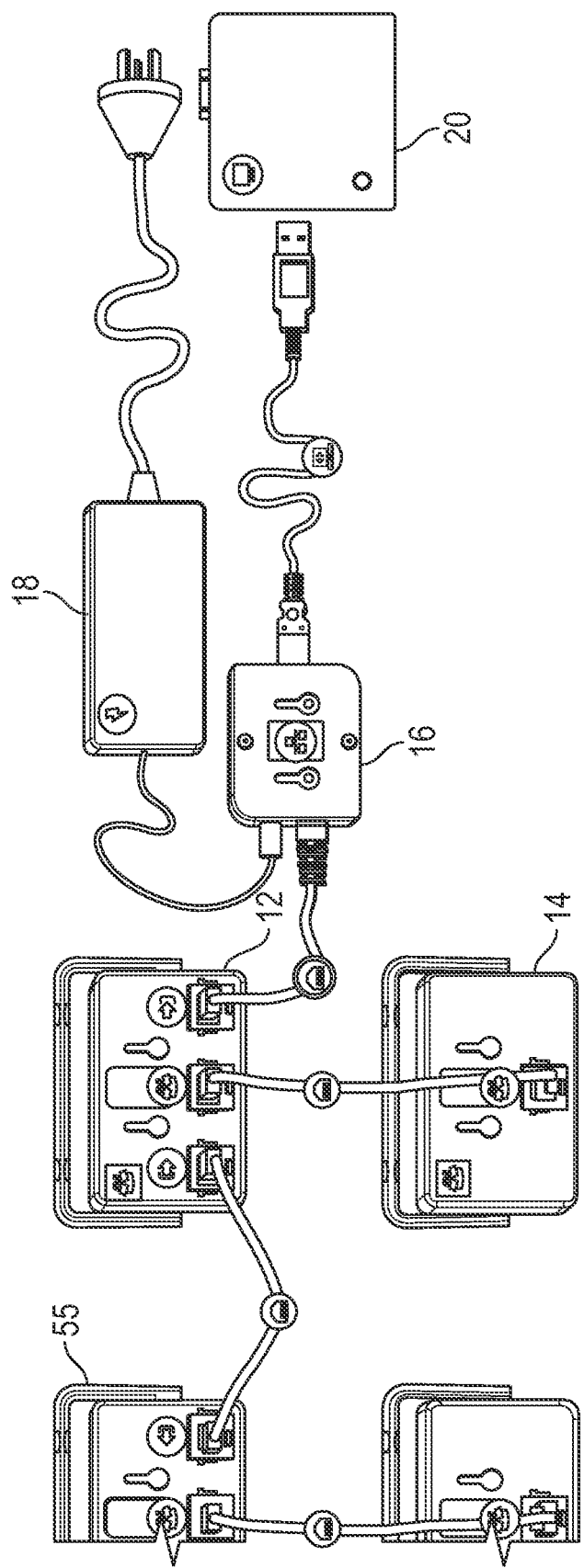
Figure 7A:
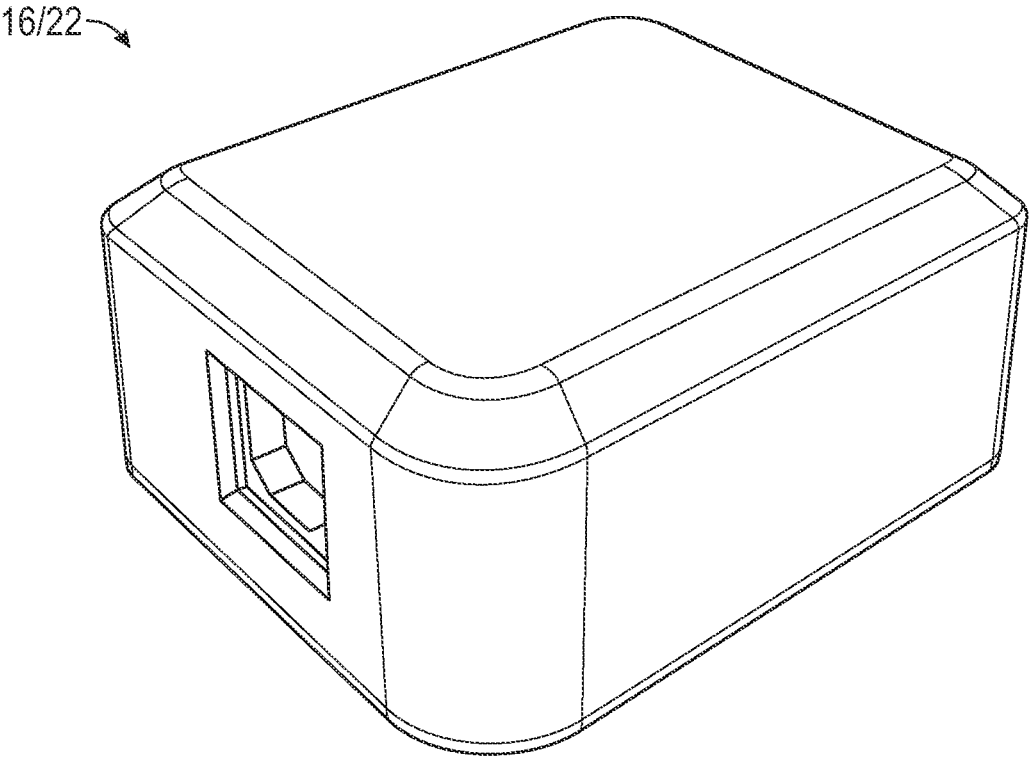
FIGS. 7A-7D are various views that schematically illustrate an example embodiment of a hub and repeater of the customizable item sorting system of FIG. 2.
Figure 7B:
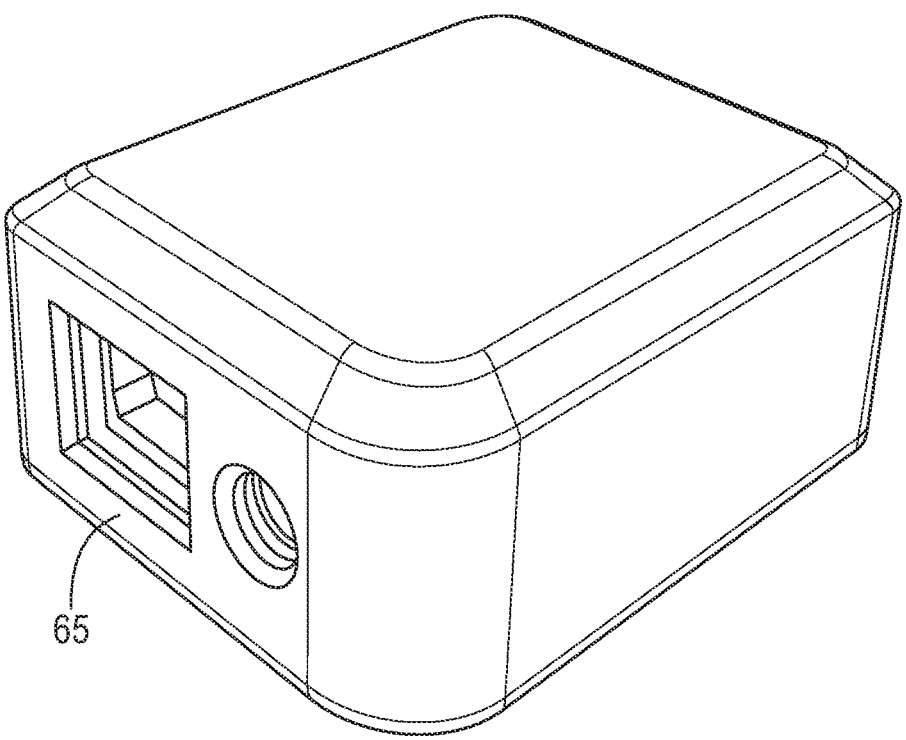
Figure 7C:
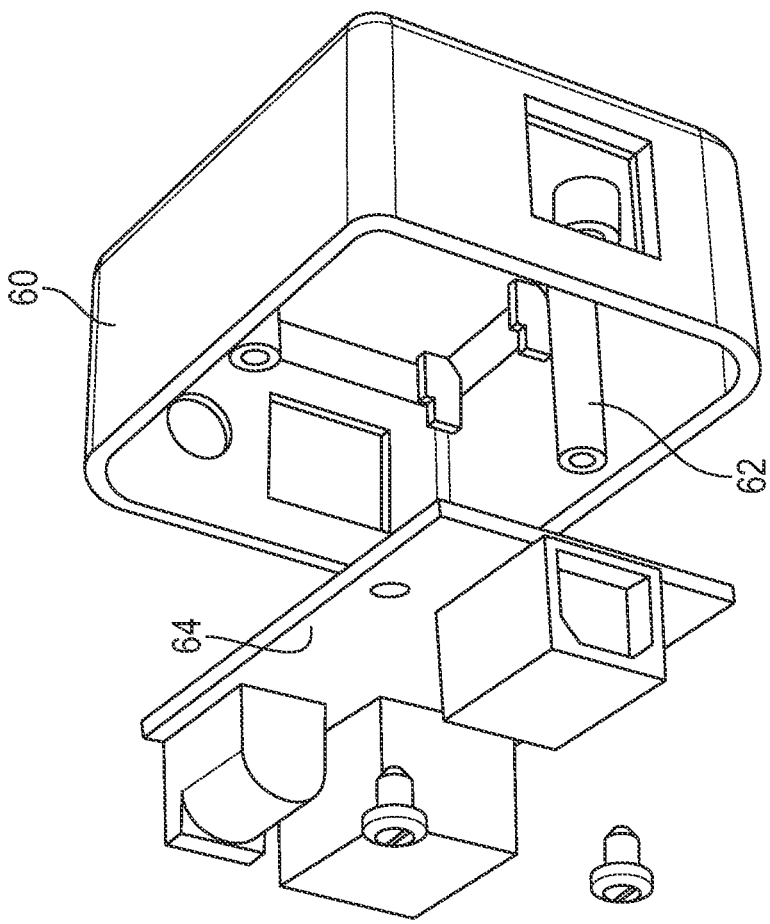
Figure 7C:
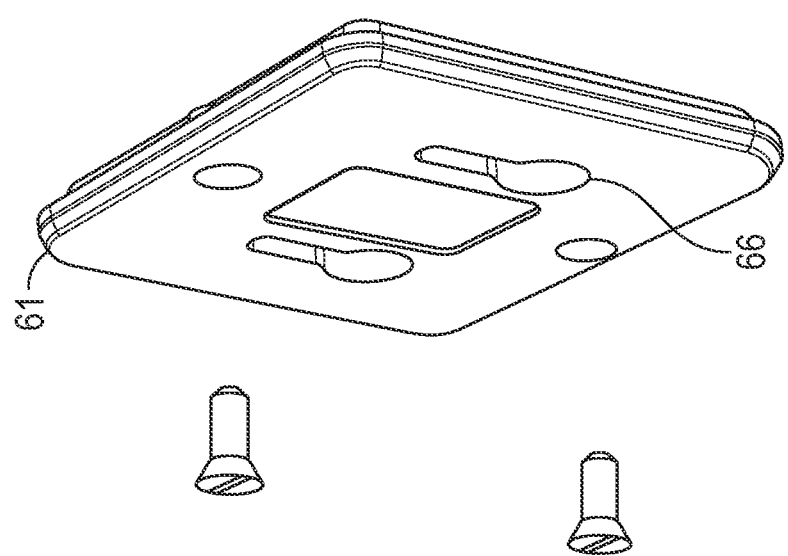
Figure 7D:
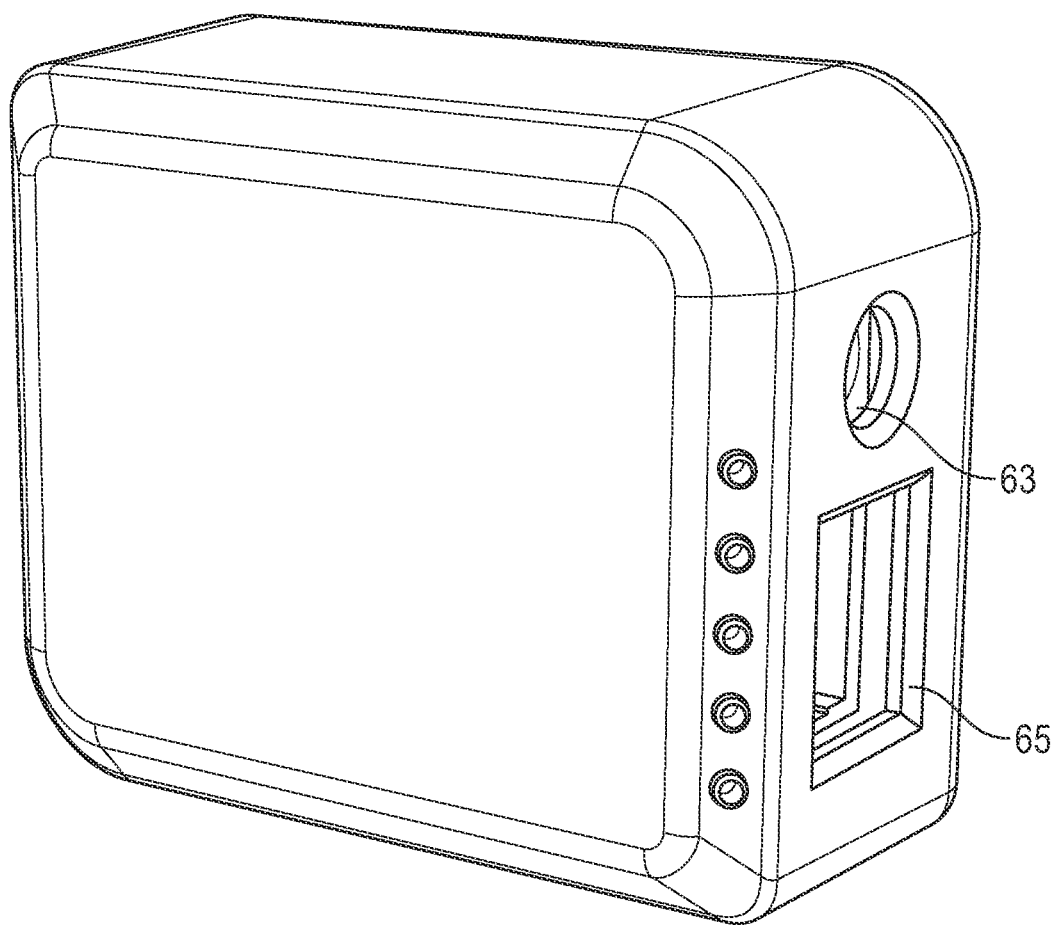

Referring additionally to the schematic illustration in FIGS. 6A and 6B, as discussed, the hub 16, or concentrator, connects to a controller 20 and to the 1st sorter light box 12 in a series of sorter light boxes that are in a chain, for example. Each sorter light box 12 may connect to a corresponding shipper light box 14 using a standard network cable (e.g. ethernet or USB). While the hub 16 is powered by an external power supply 18 (12V, 72 W, 6 A for example), Power over Ethernet may power the individual light boxes 12/14. FIG. 6A is a schematic diagram illustrating a front view of a portion of the customizable item sorting system 10, while FIG. 6B is a schematic diagram illustrating a rear view of the portion of the customizable item sorting system 10.

Power over Ethernet, or PoE, is any of several standards or ad hoc systems that pass electric power along with data on twisted pair Ethernet cabling. This allows a single cable to provide both data connection and electric power to devices such as Wireless Access Points (WAPs), Internet Protocol (IP) cameras, and Voice over Internet Protocol (VoIP) phones.

There are several common techniques for transmitting PoE cabling. Three of them have been standardized by Institute of Electrical and Electronics Engineers (IEEE) standard IEEE 802.3 since 2003. These standards are known as Alternative A, alternative B, and 4PPoE. For 10BASE-T and 100BASE-TX, only two of the four signal pairs in typical Cat 5 cable are used. Alternative B separates the data and the power conductors, making troubleshooting easier. It also makes full use of all four twisted pairs in a typical Cat 5 cable. The positive voltage runs along pins 4 and 5, and the negative along pins 7 and 8.

Alternative A transports power on the same wires as data for 10 and 100 Mbit/s Ethernet variants. This is similar to the phantom power technique commonly used for powering condenser microphones. Power is transmitted on the data conductors by applying a common voltage to each pair. Because twisted-pair Ethernet uses differential signaling, this does not interfere with data transmission. The common-mode voltage is easily extracted using the center tap of the standard Ethernet pulse transformer. For Gigabit Ethernet and faster, both alternatives A and B transport power on wire pairs also used for data since all four pairs are used for data transmission at these speeds.

In addition to standardizing existing practice for spare-pair (Alternative B), common-mode data pair power (Alternative A) and 4-pair transmission (4PPoE), the IEEE PoE standards provide for signaling between the power sourcing equipment (PSE) and powered device (PD). This signaling allows the presence of a conformant device to be detected by the power source, and allows the device and source to negotiate the amount of power required or available.

As illustrated in the example embodiment of FIGS. 1-3, 6A and 6B, the controller 20 may be coupled to the hub/concentrator via a cable (e.g. USB). The controller 20 connects to a wireless network (e.g., Wi-Fi) and to a server. The MDs are communicatively coupled to the controller 20 or server to interact with the server over Wi-Fi triggering behavior of the light boxes 12/14 that are constantly awaiting commands from the server via the controller 20.

After approximately sixteen to twenty-six sorter light boxes 12/14 in series (e.g. preferably twenty), for example, the repeater 22 may be added to the chain to push the power further along in the chain, for example, as it may be expanded to over one hundred light boxes. The hubs 16 and repeaters 22 may have the same design, as illustrated in FIGS. 7A-7D. The hubs 16 and repeaters 22 may have various features including a housing 60, base 61, attachment features 62, a power source interface/port 63, circuit board 64, network cable ports 65, and mounting features 66, for example, as illustrated.

Thus, with the above described systems, devices and methods, a shipper may set, customize, and simply rearrange any style or design of a Picking Wall or Put Wall arrangement as needed. The present customizable item sorting system 10 (or light box system) may be thought of as a DIY system as far as how a user may set up the shelves, since the light boxes 12/14 may be mounted in any area, and the light boxes are not fixed or built into any shelving.

Some of the illustrative aspects of the present invention may be advantageous in solving the problems herein described and other problems not discussed which are discoverable by a skilled artisan.

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

It should be noted that the steps described in the method of use can be carried out in many different orders according to user preference. Upon reading this specification, it should be appreciated that, under appropriate circumstances, considering such issues as design preference, user preferences, marketing preferences, cost, structural requirements, available materials, technological advances, etc., other methods of use arrangements such as, for example, different orders within above-mentioned list, elimination or addition of certain steps, including or excluding certain maintenance steps, etc., may be sufficient.

Users may download an application on their mobile phones, tablets or any other mobile computing device, and even a vehicle.

The foregoing disclosure provides illustration and description but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features may be recited in claims and/or disclosed in the specification, these combinations are not intended to limit the disclosure of possible implementations. In fact, many of these features may be combined in ways not specifically recited in the claims and/or disclosed in the specification. Although each dependent claim listed herein may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Furthermore, as used herein, the term "set" is intended to include one or more items (e.g., related items, unrelated items, a combination of related items, and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

As may be used herein, the terms "substantially" and "approximately" provides an industry-accepted tolerance for its corresponding term and/or relativity between items. Such an industry-accepted tolerance ranges from less than one percent to fifty percent. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module). As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship.

As may also be used herein, the terms "processor", "module", "processing circuit", and/or "processing unit" (e.g., including various modules and/or circuitries such as may be operative, implemented, and/or for encoding, for decoding, for baseband processing, etc.) may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may have an associated memory and/or an integrated memory element, which may be a single memory device, a plurality of memory devices, and/or embedded circuitry of the processing module, module, processing circuit, and/or processing unit. Such a memory device may be a read-only memory (ROM), random access memory (RAM), volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contrary, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of the various embodiments of the present invention. A module includes a functional block that is implemented via hardware to perform one or module functions such as the processing of one or more input signals to produce one or more output signals. The hardware that implements the module may itself operate in conjunction software, and/or firmware. As used herein, a module may contain one or more sub-modules that themselves are modules.

While particular combinations of various functions and features of the present invention have been expressly described herein, other combinations of these features and functions are likewise possible. The present invention is not limited by the particular examples disclosed herein and expressly incorporates these other combinations.

The embodiments of the invention described herein are exemplary and numerous modifications, variations and rearrangements can be readily envisioned to achieve substantially equivalent results, all of which are intended to be embraced within the spirit and scope of the invention. Further, the purpose of any included abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

The above description provides specific details, such as material types and processing conditions to provide a thorough description of example embodiments. However, a person of ordinary skill in the art would understand that the embodiments may be practiced without using these specific details.

Some of the illustrative aspects of the present invention may be advantageous in solving the problems herein described and other problems not discussed which are discoverable by a skilled artisan. While the above description contains much specificity, these should not be construed as limitations on the scope of any embodiment, but as exemplifications of the presented embodiments thereof. Many other ramifications and variations are possible within the teachings of the various embodiments. While the invention has been described with reference to exemplary embodiments, it will be understood by those skilled in the art that various changes may be made, and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced items.

What is claimed is:

1. A sorting system comprising:
   a plurality of sorter light boxes each configured to be mounted to a respective shelf, and each configured to be coupled to another one of the sorter light boxes to define a chain of sorter light boxes;
   a hub configured to be coupled to a first sorter light box in the chain of sorter light boxes and to operate as a concentrator of control signals and power for the plurality of sorter light boxes in the chain of sorter light boxes; and
   a controller configured to be coupled to the hub and generate control signals for the sorter light boxes.

2. The sorting system of claim 1, further comprising a first power supply configured to be coupled to the hub and supply power to the plurality of sorter light boxes.

3. The sorting system of claim 2, further comprising a repeater configured to be coupled within the chain of sorter light boxes to push power along the chain of sorter light boxes.

4. The sorting system of claim 2, wherein the plurality of sorter light boxes are configured to receive Power over Ethernet (PoE) via the hub and the first power supply.

5. The sorting system of claim 1, wherein the controller is configured to generate the control signals for the plurality of sorter light boxes based upon commands received via an externally coupled network and sorter scans from a handheld device coupled thereto.

6. The sorting system of claim 5, wherein the handheld device includes a mobile application to emit the commands based upon the sorter scans by the handheld device.

7. The sorting system of claim 1, wherein each of the plurality of sorter light boxes are configured to provide a light indication that indicates to a sorter which respective shelf to place the item.

8. The sorting system of claim 1, wherein each of the plurality of sorter light boxes are configured to provide a designated colored light indication; and wherein the designated colored light indication is associated with a respective sorter.

9. The sorting system of claim 1, wherein each of the plurality of sorter light boxes includes a housing and a light source; and wherein the housing includes at least one of mounting features and a mounting bracket.

10. The sorting system of claim 1, wherein the controller includes a wireless communication interface to communicate with an externally coupled network.

11. A sorting system comprising:
a plurality of shipper light boxes each configured to be positioned on a respective shelf and coupled to one another;
a first power supply configured to be coupled to the plurality of shipper light boxes and to supply power to the plurality of shipper light boxes; and
a controller coupled to the plurality of shipper light boxes and configured to generate control signals for the shipper light boxes based upon commands received via an externally coupled network;
wherein each of the shipper light boxes of the plurality of shipper light boxes includes an internal light source.

12. The sorting system of claim 11, wherein the controller is configured to generate the control signals for the shipper light boxes based upon commands received via the externally coupled network and sorter scans from a handheld device coupled thereto.

13. The sorting system of claim 11, wherein each of the plurality of shipper light boxes are configured to provide a light indication indicating that an order is ready to be shipped.

14. The sorting system of claim 11, wherein each of the shipper light boxes of the plurality of shipper light boxes includes at least one of a housing, a lens, mounting features, and a mounting bracket.

15. The sorting system of claim 11, further comprising a second power supply, and a hub configured to be coupled to at least one of the shipper light boxes of the plurality of shipper light boxes and configured to operate as a concentrator of the control signals and power for the plurality of shipper light boxes, and wherein the plurality of shipper light boxes are configured to receive Power over Ethernet (PoE) via the hub, the first power supply, and the second power supply.

16. The sorting system of claim 11, wherein the controller includes a wireless communication interface to communicate with the externally coupled network.

17. The sorting system of claim 11, further comprising a repeater configured to be coupled within the plurality of shipper light boxes to push power along the plurality of shipper light boxes.

18. A sorting system comprising:
a plurality of sorter light boxes each configured to be mounted to a respective shelf, and each configured to be coupled to another one of the sorter light boxes to define a chain of sorter light boxes;
a plurality of shipper light boxes each configured to be coupled to a respective sorter light box of the plurality of sorter light boxes and positioned at the respective shelf; and
a hub configured to be coupled to a first sorter light box in the chain of sorter light boxes and relay control signals to the chain of sorter light boxes;
wherein each of the plurality of shipper light boxes includes an internal light source.

19. The sorting system of claim 18, further comprising a controller configured to be coupled to the hub and to generate control signals based upon commands received via an externally coupled network and sorter scans from a handheld device coupled thereto.

20. The sorting system of claim 19, wherein the handheld device is configured run a mobile application to emit the commands based upon the sorter scans by the handheld device.

21. The sorting system of claim 19, wherein the controller includes a wireless communication interface to communicate with the externally coupled network.

22. The sorting system of claim 18, further comprising a first power supply configured to be coupled to the hub, wherein the hub is configured to operate as a concentrator of power for the chain of sorter light boxes.

23. The sorting system of claim 22, further comprising a repeater coupled within the chain of sorter light boxes to push power along the chain of sorter light boxes.

24. The sorting system of claim 22, wherein the plurality of sorter light boxes are configured to receive Power over Ethernet (PoE) via the hub and the first power supply.

25. The sorting system of claim 18, wherein each of the plurality of sorter light boxes are configured to provide a designated colored light indication that indicates to a sorter which respective shelf to place the item; and wherein the designated colored light indication is associated with a respective sorter.

26. The sorting system of claim 18, wherein each of the plurality of sorter light boxes includes a housing and a light source; and wherein the housing includes at least one of mounting features and a mounting bracket.

27. A sorting system comprising:
a plurality of sorter light boxes each configured to be positioned on a respective shelf and coupled to another one of the sorter light boxes to define a chain of sorter light boxes;
a plurality of shipper light boxes each configured to be coupled to a respective sorter light box of the chain of sorter light boxes and positioned on the respective shelf;
a hub configured to be coupled to a first sorter light box in the chain of sorter light boxes and to operate as a concentrator of control signals for the plurality of sorter light boxes; and
a controller configured to be coupled to the hub;
wherein each sorter light box in the chain of sorter light boxes includes a plurality of light elements.

28. The sorting system of claim 27, wherein each shipper light box of the plurality of shipper light boxes further includes a lighting element.

29. The sorting system of claim 27, wherein the controller is configured to generate the control signals for the chain of sorter light boxes and the plurality of shipper light boxes based on commands via an externally coupled network.

30. The sorting system of claim 27, wherein the controller is configured to generate the control signals for the sorter light boxes based upon commands received from sorter scans from a handheld device.

31. The sorting system of claim 30, further comprising a screen in communication with at least one of the controller and the handheld device, wherein a graphical user interface (GUI) is displayed on the screen, and wherein the GUI is configured to be operable to edit and add parameters for the chain of sorter light boxes.

32. The sorting system of claim 30, wherein the handheld device comprises a scanner ring configured to be operable as a wearable barcode scanner.

33. The sorting system of claim 31, wherein the GUI is configured to display suggestions of what sort to complete next, to filter orders, and to accept replacement items for orders.

34. The sorting system of claim 27, further comprising a hub web application general user interface configured to be displayed on a screen of a client device and to display monitored sorting activity of the chain of sorter light boxes.

35. The sorting system of claim 34, wherein the client device comprises at least one of a personal computer, tablet, and laptop.

* * * * *